(12) United States Patent
Ramanathan et al.

(10) Patent No.: US 11,165,658 B2
(45) Date of Patent: Nov. 2, 2021

(54) SYSTEMS AND METHODS FOR CONTEXTUAL NETWORK ASSURANCE BASED ON CHANGE AUDITS

(71) Applicant: Cisco Technology, Inc., San Jose, CA (US)

(72) Inventors: Shankar Ramanathan, Richardson, TX (US); Muhilan Natarajan, Allen, TX (US); Gonzalo Salgueiro, Raleigh, NC (US); Jerome Henry, Pittsboro, NC (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 99 days.

(21) Appl. No.: 16/562,073

(22) Filed: Sep. 5, 2019

(65) Prior Publication Data
US 2021/0075689 A1  Mar. 11, 2021

(51) Int. Cl.
*H04L 12/24* (2006.01)
*G06N 3/08* (2006.01)

(52) U.S. Cl.
CPC .......... *H04L 41/147* (2013.01); *G06N 3/08* (2013.01); *H04L 41/16* (2013.01); *H04L 41/22* (2013.01)

(58) Field of Classification Search
CPC ........ H04L 41/147; H04L 41/16; H04L 41/22
See application file for complete search history.

(56) References Cited

U.S. PATENT DOCUMENTS

| | | | |
|---|---|---|---|
| 8,255,524 B2 | 8/2012 | Devitt | |
| 9,531,589 B2 | 12/2016 | Clemm et al. | |
| 9,923,787 B2 | 3/2018 | Ngoo et al. | |
| 2004/0088406 A1* | 5/2004 | Corley | H04L 41/064 709/224 |
| 2015/0333953 A1* | 11/2015 | Vasseur | H04L 47/127 370/228 |
| 2017/0250855 A1* | 8/2017 | Patil | H04L 41/064 |
| 2017/0265089 A1 | 9/2017 | Sanneck et al. | |
| 2019/0171187 A1* | 6/2019 | Celia | G05B 23/0221 |
| 2019/0379592 A1* | 12/2019 | Samadi | H04W 4/021 |

FOREIGN PATENT DOCUMENTS

WO  2014102318 A1  7/2014

* cited by examiner

*Primary Examiner* — Minh Chau Nguyen
(74) *Attorney, Agent, or Firm* — Polsinelli PC

(57) ABSTRACT

Aggregated health information for a managed network may be retrieved and processed in response to changes to the managed network topology, configuration, or software. In response to receiving notification that a change to a component of the managed network has occurred, a change audit analysis engine can retrieve performance indicator information from components along a traceroute including the component which underwent the change. The retrieved performance indicator information can be processed by a memory based neural network to predict an impact of the change on the aggregated health of the managed network. The predicted impact can be compared to network health information retrieved through an ongoing basis and issues can be determined based on a comparison of the predict impact and the retrieved health information.

20 Claims, 17 Drawing Sheets

300A cisco DNA CENTER

※ Design — 206
Model your entire network, from ??? and buildings to devices and ???, both physical and virtual, across campus, branch, WAN and cloud.
- Add ??? locations on the network
- Designate golden images for device families
- Create wireless profiles of SSIDs

⚙ Provision — 210
Provide new services to users with ????, speed and security across your enterprise network, regardless of network ????? and complexity.
- Discover and provision switches to ?????????? sites
- Provision WLCs and APs to ?????? sites
- Set up Campus Fabric across switches

⌂ Platform — 214
Use DNA-C Platform to unlock the full potential of DNA-C using APIs, integration capabilities and Data services
- View the API Catalog
- Configure DNA- to - Third Party Integrations
- Schedule and Download - Data Sets and Reports

≪ Policy — 208
Use policies to complete and simplify network management, reducing cost and risk while speeding rollout of new and enhanced services
- Segment your network as Virtual Networks
- Create scalable groups to describe your critical assets
- Define segments from policies to meet your policy goals

▦ Assurance — 212
Use proactive monitoring and insights from the network, devices, and applications to predict problems faster and ????? that policy and configuration changes achieve the ???????? internet and the user experience you want.
- Assurance Health
- Assurance ?????

Tools — 216

| Discovery 302 | Inventory 304 | Topology 306 | Image Repository 308 |
|---|---|---|---|
| Automatic addition of devices in controller inventory | Add, update or delete devices that are managed by the controller | Visualize how devices are interconnected and how they communicate | Download and manage physical and virtual software images automatically |

| Command Runner 310 | License Manager 312 | Template Editor 314 | Network Plug and Play 316 |
|---|---|---|---|
| Allows you to run diagnostic CLIs against one or more devices | Visualize and manage license usage | An interactive editor to author CLI templates | A simple and secure approach to provision networks with a near zero touch experience |

| Telemetry 318 | Data Sets and Reports 320 | | |
|---|---|---|---|
| Telemetry Design and Provision | Access Data Sets, Schedule Data Extracts for Download in multiple formats like PDF Reports, CSV, Tables etc | | |

CISCO DNA CENTER — DESIGN | POLICY | PROVISION | ASSURANCE | PLATFORM

Devices | Fabric

Device Inventory

Inventory (4)  Unclaimed Devices

○ Select device(s) to assign to a Site and Provision network settings from the Network Hierarchy.

Network Telemetry | Upgrade Readiness | Update Status | Refresh

▽ Filter | Actions ∨ | ○ LAN Automation ∨

| Device Name ▲ | Device Family | IP Address | Site | Serial Number | Uptime | OS Version | OS Image | Last Sync Status | Credential Status | Last Provisioned Time | Provision Status |
|---|---|---|---|---|---|---|---|---|---|---|---|
| asr1001-x.abc.inc | Routers | 10.10.22.74 | ...elbourne/MEL2 | FXS1932Q1SE | 25 days, 10:24:02.73 | 16.3.2 | asr1001x-univ... Tag Golden | Managed | Not Provisioned | - | Not Provisioned |
| cat_9k_1.abc.inc | Switches and Hubs | 10.10.22.66 | ...l/Sydney/NSD5 | FCW2136L0AK | 23 days, 16:53:39.86 | 16.6.1 | packages.conf Tag Golden | Managed | Not Provisioned | - | Not Provisioned |
| cat_9k_2.abc.inc | Switches and Hubs | 10.10.22.70 | ...l/Sydney/NSD5 | FCW2140L039 | 23 days, 16:50:58.36 | 16.6.1 | packages.conf Tag Golden | Managed | Not Provisioned | - | Not Provisioned |
| cs3850.abc.inc | Switches and Hubs | 10.10.22.69 | ...l/Sydney/NSD5 | FOC1833X0AR | 23 days, 16:27:28.67 | 16.6.2s | packages.conf Tag Golden | Managed | Not Provisioned | - | Not Provisioned |

1 to 4 of 4

SYSTEMS AND METHODS FOR CONTEXTUAL NETWORK ASSURANCE BASED ON CHANGE AUDITS

TECHNICAL FIELD

The subject matter of this disclosure relates in general to the field of computer networking, and more particularly, to detecting network issues using a predictive topology analysis.

BACKGROUND

Network health reports and scores on assurance applications typically produce time-based reports, such as aggregated health scores or analyses for the past hour, 12 hours, 24 hours, week, month, etc. However, time-based reports provide no direct correlation between health scores network topology or configuration changes. For example, if a new feature is added to a network device (e.g., new Quality of Service (QOS) levels on a router, etc.), an aggregated time-based report cannot provide a direct accounting of the impact of the new feature distinct from the impact of any other network changes within the same timeframe.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3I illustrate examples of graphical user interfaces for a network management system in accordance with some examples;

DESCRIPTION OF EXAMPLE EMBODIMENTS

Figure 1:
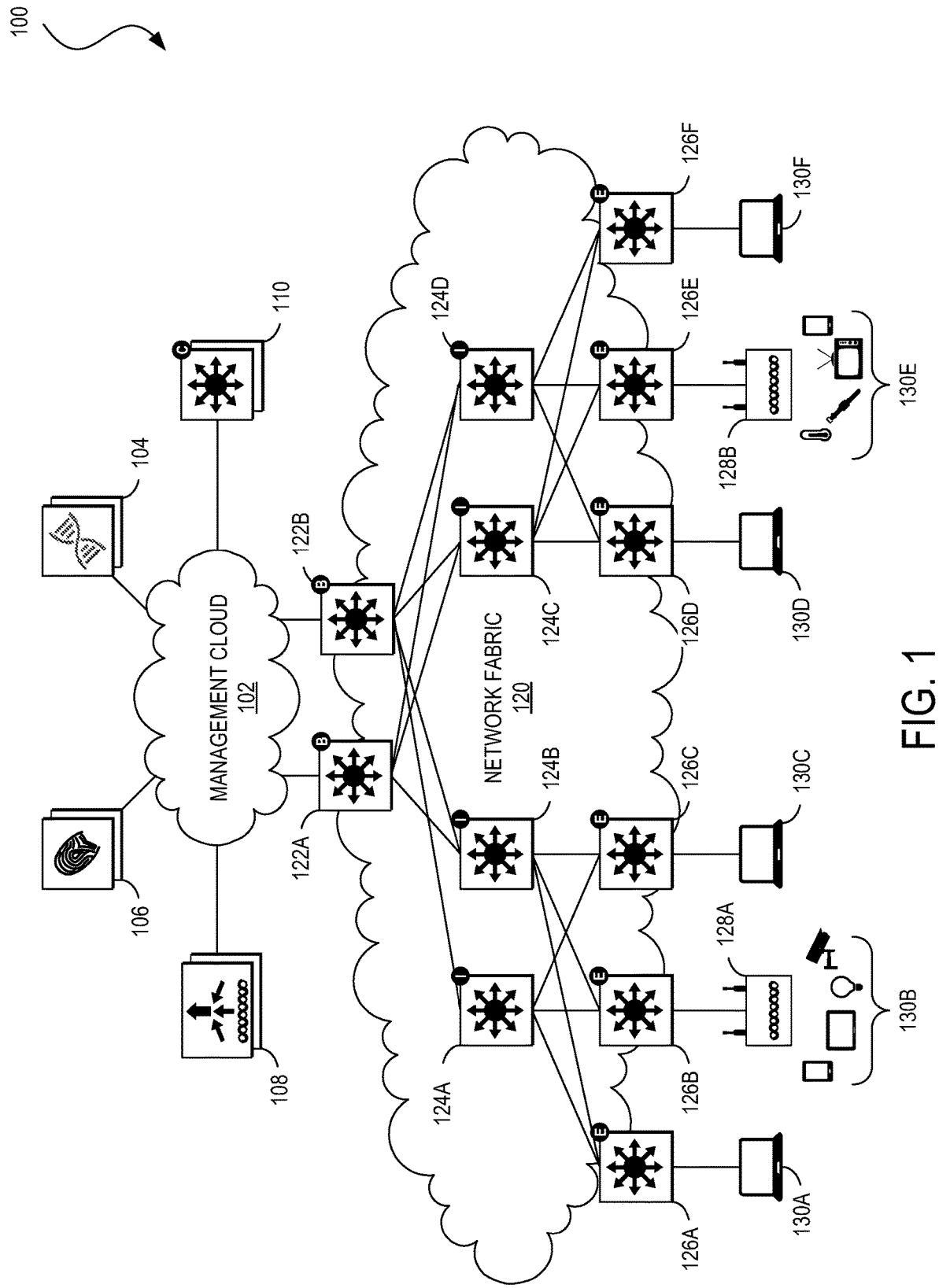
FIG. 1 illustrates an example of a physical topology of an enterprise network in accordance with some examples.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods are provided for identifying network issues (e.g., changes to network health scores, performance indicators, etc.) in response to detecting a configuration, architecture, or topology change to the respective network. In particular, network impact resulting from configuration changes on and/or across network devices (e.g., routers, switches, etc.) may be predicted by a neural network processing historical, current, and/or rolling network health information. As a result, where the neural network predicts a negative network impact or a measured network performance deviates substantially from an expected network performance based on the predicted network impact, automated remediation, alerts, and other downstream processes may be activated accordingly.

Example Embodiments

A network manager, such as that discussed below (e.g., Cisco DNA™ Center), may generate a mapping of a respective network topology. In particular, each element of the network topology may impact performance of other elements within the topology. For example, the performance of a network switch may impact the performance of associated with routers which may each have different, and potentially conflicting, respective policies or traffic routing rules to enforce on traffic across the network. As a result, network impact analysis related to device configuration changes may be performed with a holistic approach to better monitor and/or predict overall network performance.

In one example, a change audit analytics engine (CAAE) can be run alongside a network assurance platform to audit the network in response to detected configuration changes. The CAAE includes machine learning components such as, for example and without imputing limitation, a recurrent neural network (RNN) with long short term memory (LSTM) to generate predictions and perform predictive analytics for device and/or network performance in response to the detected configuration changes. For example, recorded configuration changes may be associated with respective historical key performance indicators (KPIs) and the recorded configuration changes and KPIs may be used to train a machine learning model (e.g., a LSTM RNN, etc.) to predict network and/or device performance values (e.g., predicted KPIs) based on configuration changes and/or features associated with configuration changes.

As a result of predictions by the trained machine learning model, automated network corrections, configuration resets, administrator notices and/or alerts, and the like may be triggered. In some examples, using the trained machine learning model, a user (e.g., a network administrator, etc.) may perform simulated configuration changes and other what-if scenarios to determine possible network impacts before deploying the changes to the live network.

In some examples, the CAAE, upon detecting a network configuration change, performs a traffic path based impact analysis and a time based impact analysis. In general, the traffic path based impact analysis correlates health of individual network elements along a traffic path including an element for which a configuration change has been detected. In comparison, the time based impact analysis may predict (and learn) the impact of the detected configuration change on overall network health in the future.

In particular, for the traffic path based impact analysis, the CAAE can follow a traffic path impacted by configuration change to gather KPIs from each network element along the traffic path. As a result, the CAAE may also learn which network elements are affect by particular configuration changes and also how the network elements are affected. The CAAE may follow the traffic path based on a path trace tool identifying said path through the network.

Additionally, the CAAE may trigger a network health audit time frame following the detected configuration change in order to generate a time based analysis for each component (e.g., for training a model, etc.). In particular, the CAAE examines the effect of the configuration change on the connected other network components.

For the time based impact analysis, the health impact on network components (e.g., changes to respective KPIs) of the configuration change is recorded for processing by a machine learning component. The machine learning component may use the recorded component health impact to determine indirect and direct effects of configuration changes. In some examples, the machine learning component may also group types of component health impact into categories based on changes to various particular KPIs for each component (e.g., increases roaming time, decreases overall cell speed, spread broadcast to larger domains, reduces ARP counts, etc.).

In some aspects, the machine learning component matches performance changes with the time at which the configuration change was propagated to the network. This may be done outside of the traffic paths of the traffic path based impact analysis discussed above. Further, a clustering technique can be used to identify outliers, such as network components, which perform over an average KPI, displaying a sudden change at, or after, the configuration change was introduced.

Additionally, the machine learning component may learn (e.g., increase predictive accuracy) by comparing earlier and/or stored historical health impact reports for similar configuration changes in the same or substantially similar networks. Likewise, new configuration change network health impact analysis reports may be stored for future reference.

In some examples, the CAAE may include have access to a graphical interface component. As a result, the CAAE can generate a view including a record of configuration change and/or software change triggered impact audits, giving a user (e.g., network administrator, etc.) an at a glance view of a respective network health history based on configuration changes rather than only aggregated according to timeframe.

The disclosure now turns to a discussion of methods and system which may be used to support the methods and systems discussed above. Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can include one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can include fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may include a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
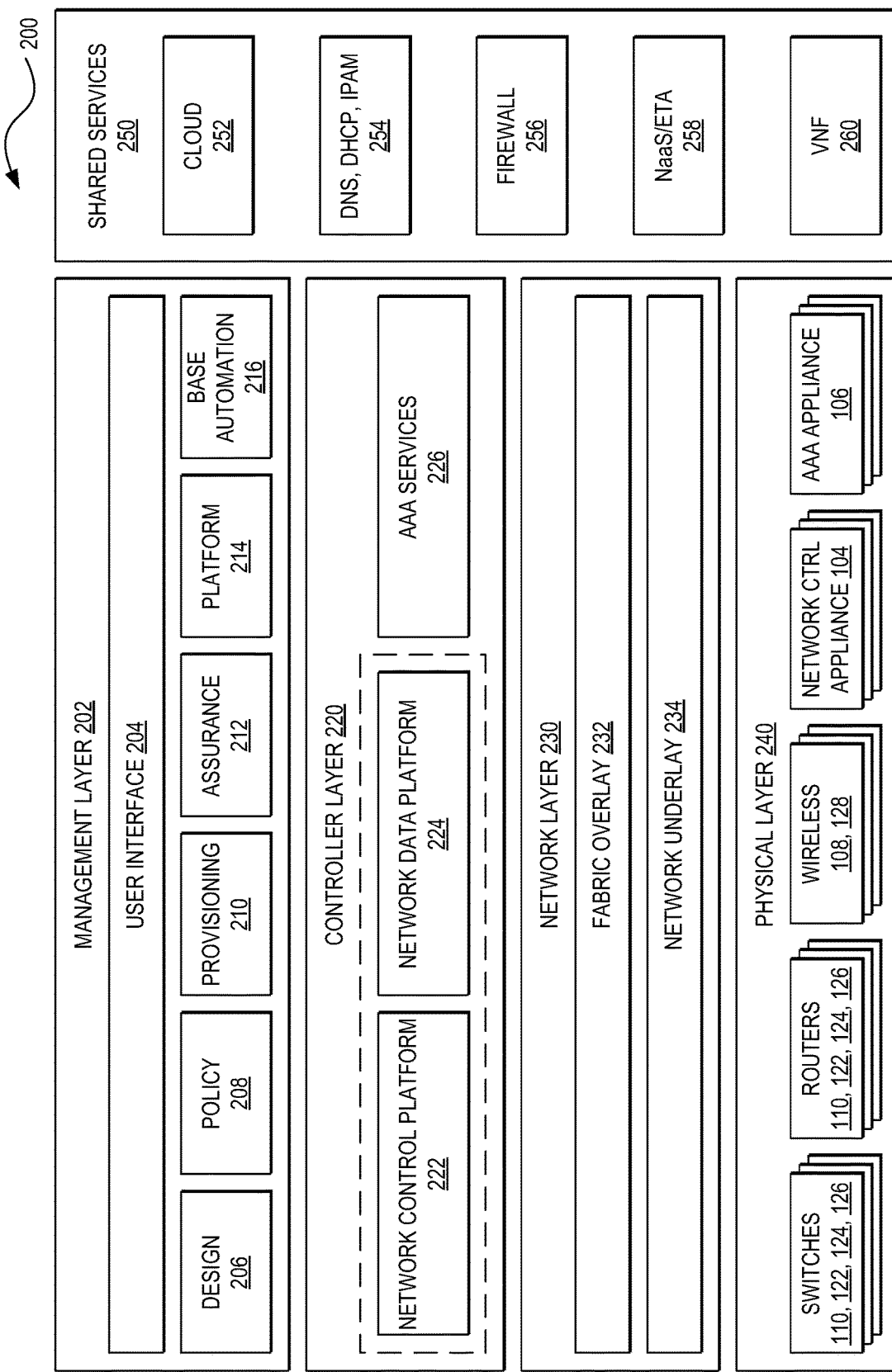
FIG. 2 illustrates an example of a logical architecture for an enterprise network in accordance with some examples.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
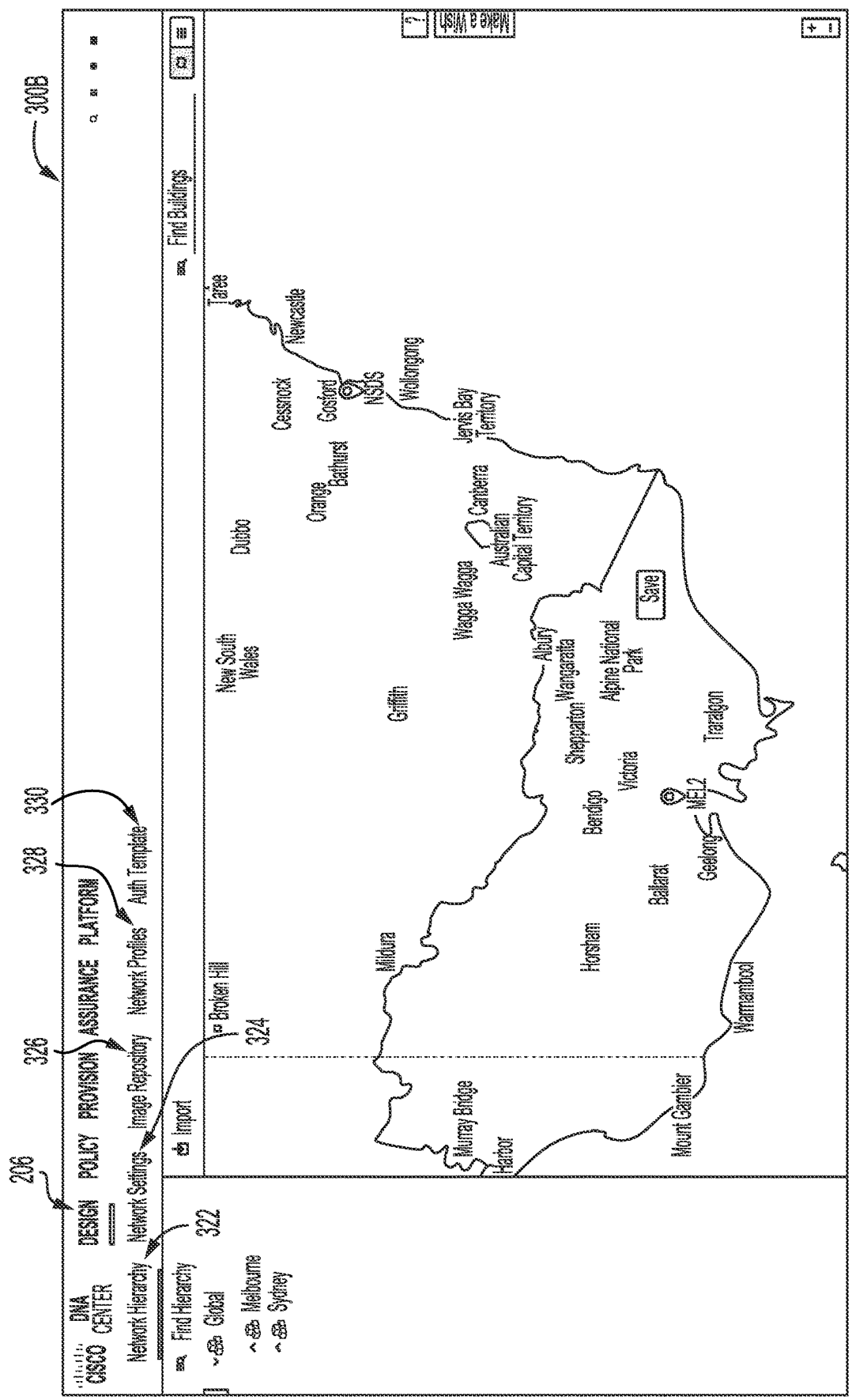

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
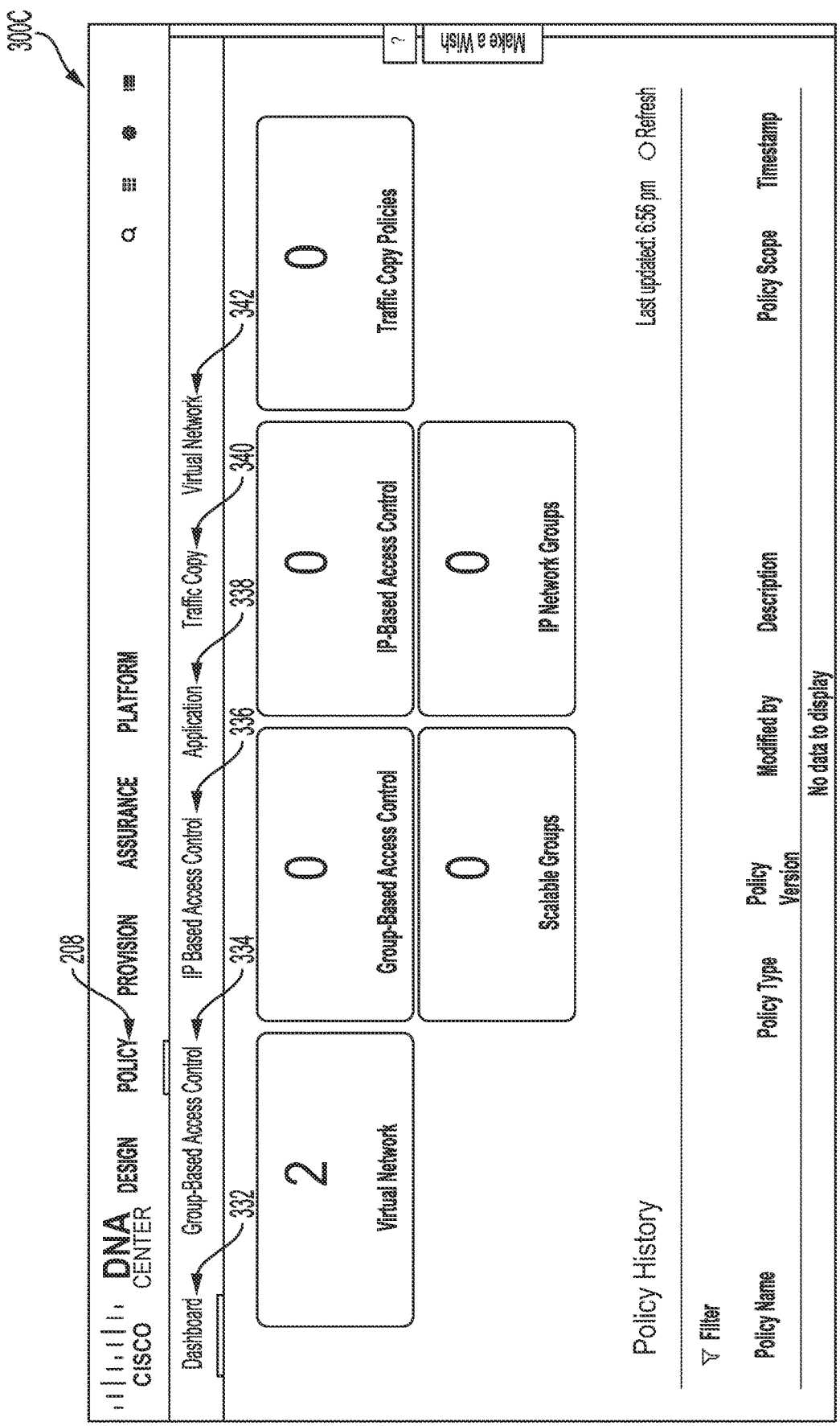

FIG. 3C illustrates a graphical user interface 300C, an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or SGACLs. A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

FIG. 3D illustrates a graphical user interface 300D, an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
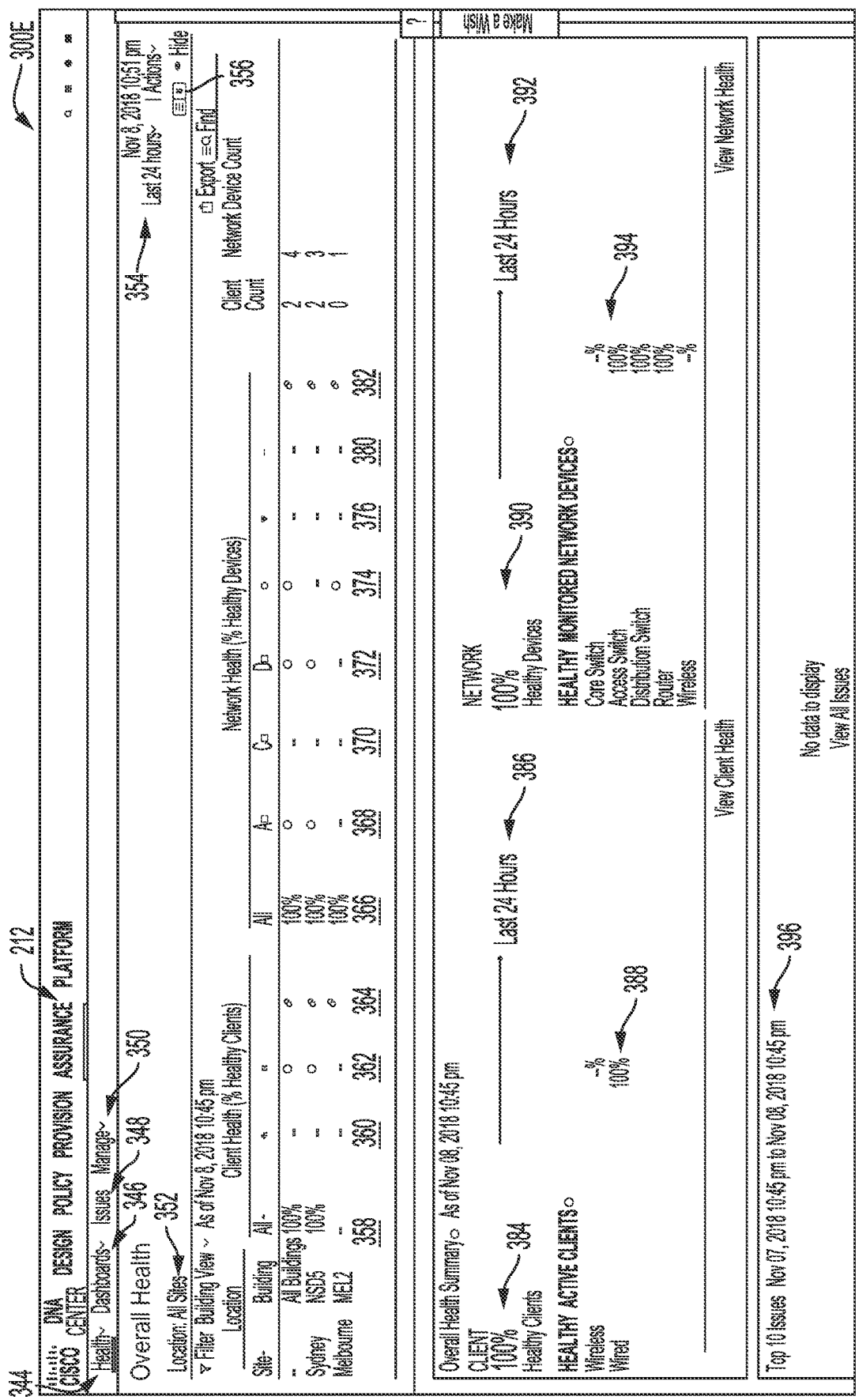

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
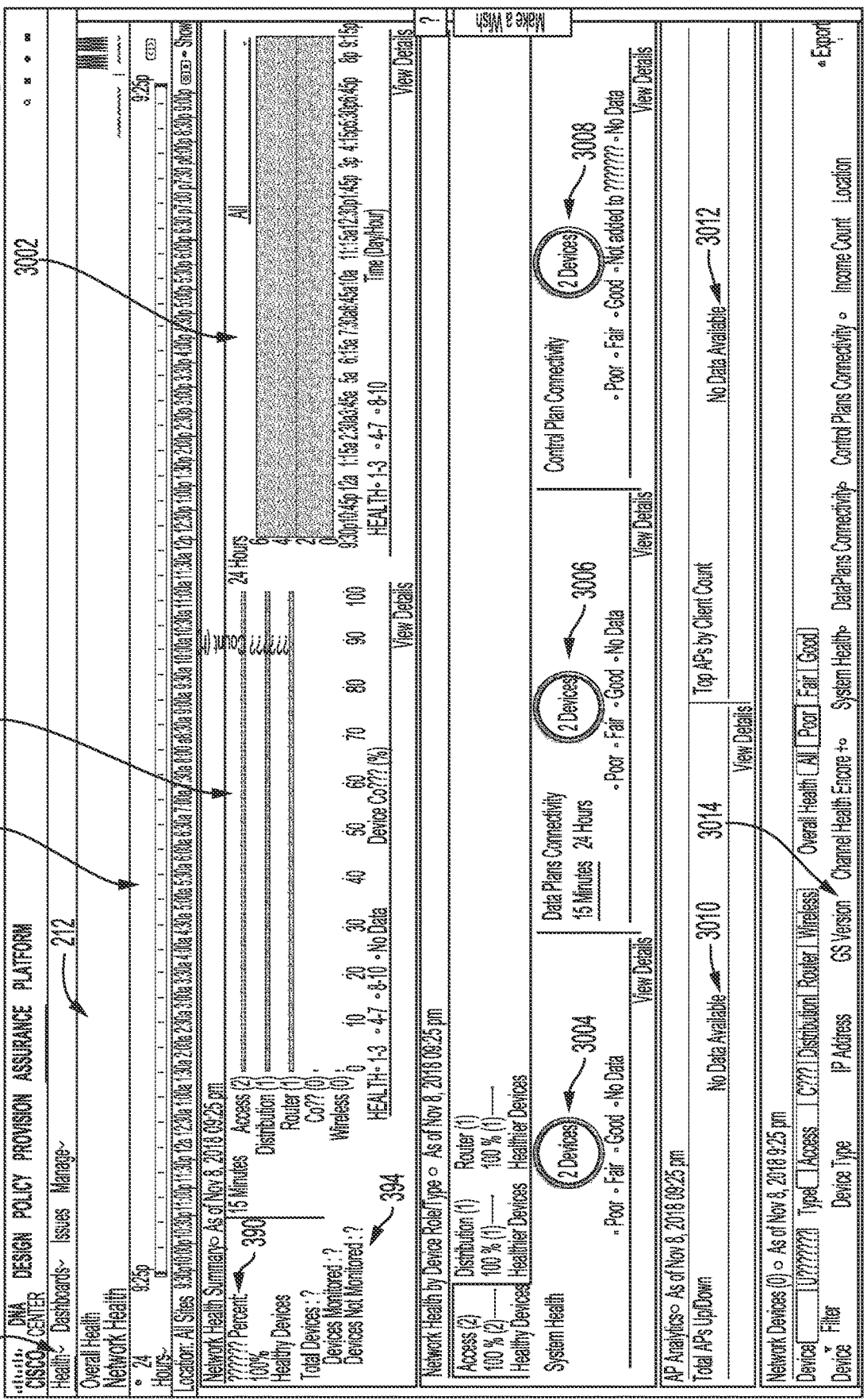

FIG. 3F illustrates a graphical user interface 300F, an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
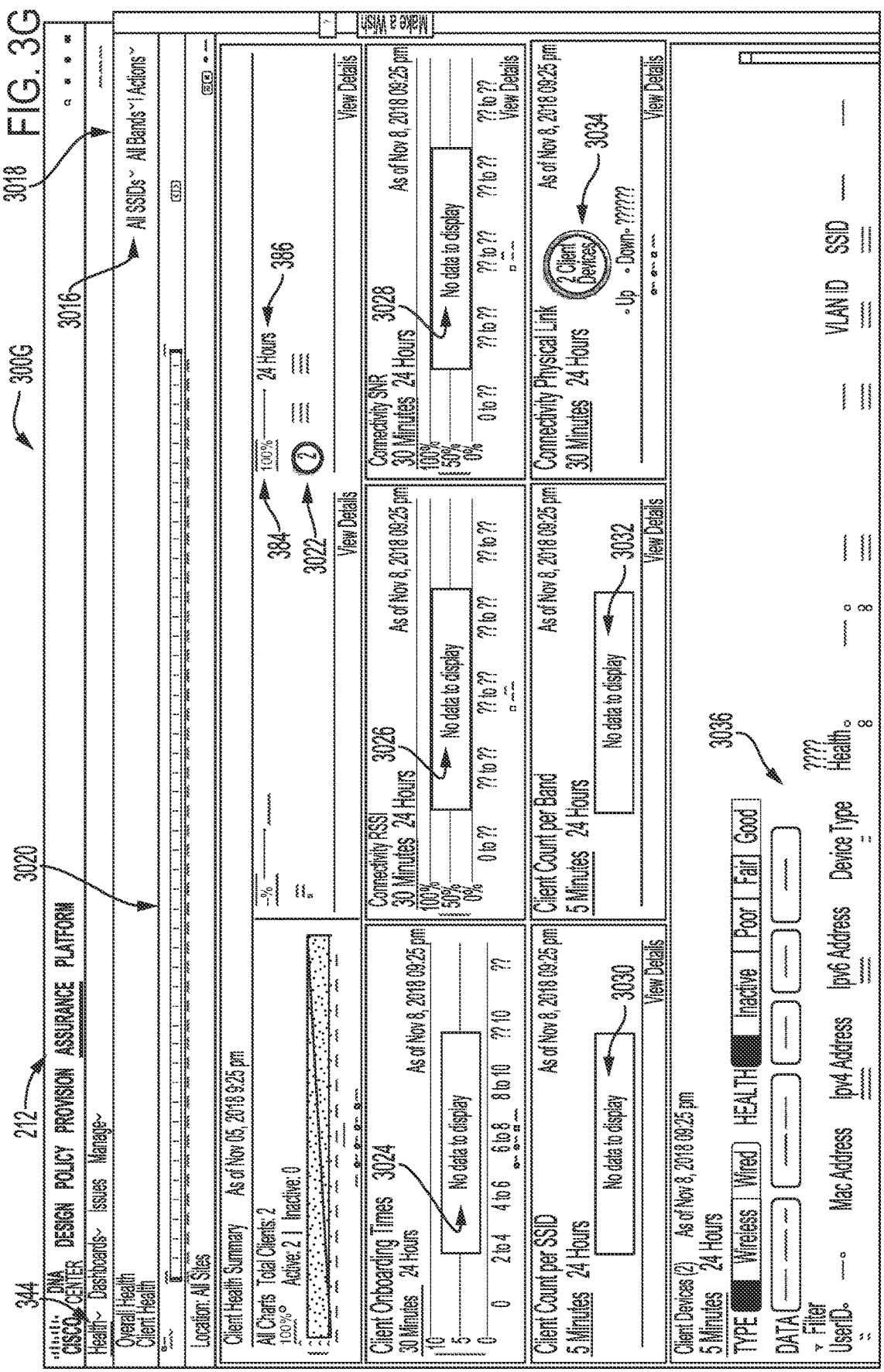

FIG. 3G illustrates a graphical user interface 300G, an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:

Client onboarding times 3024;
Received Signal Strength Indications (RSSIs) 3026;
Connectivity signal-to-noise ratios (SNRs) 3028;
Client counts per SSID 3030;
Client counts per band frequency 3032;
DNS requests and response counters (not shown); and
Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
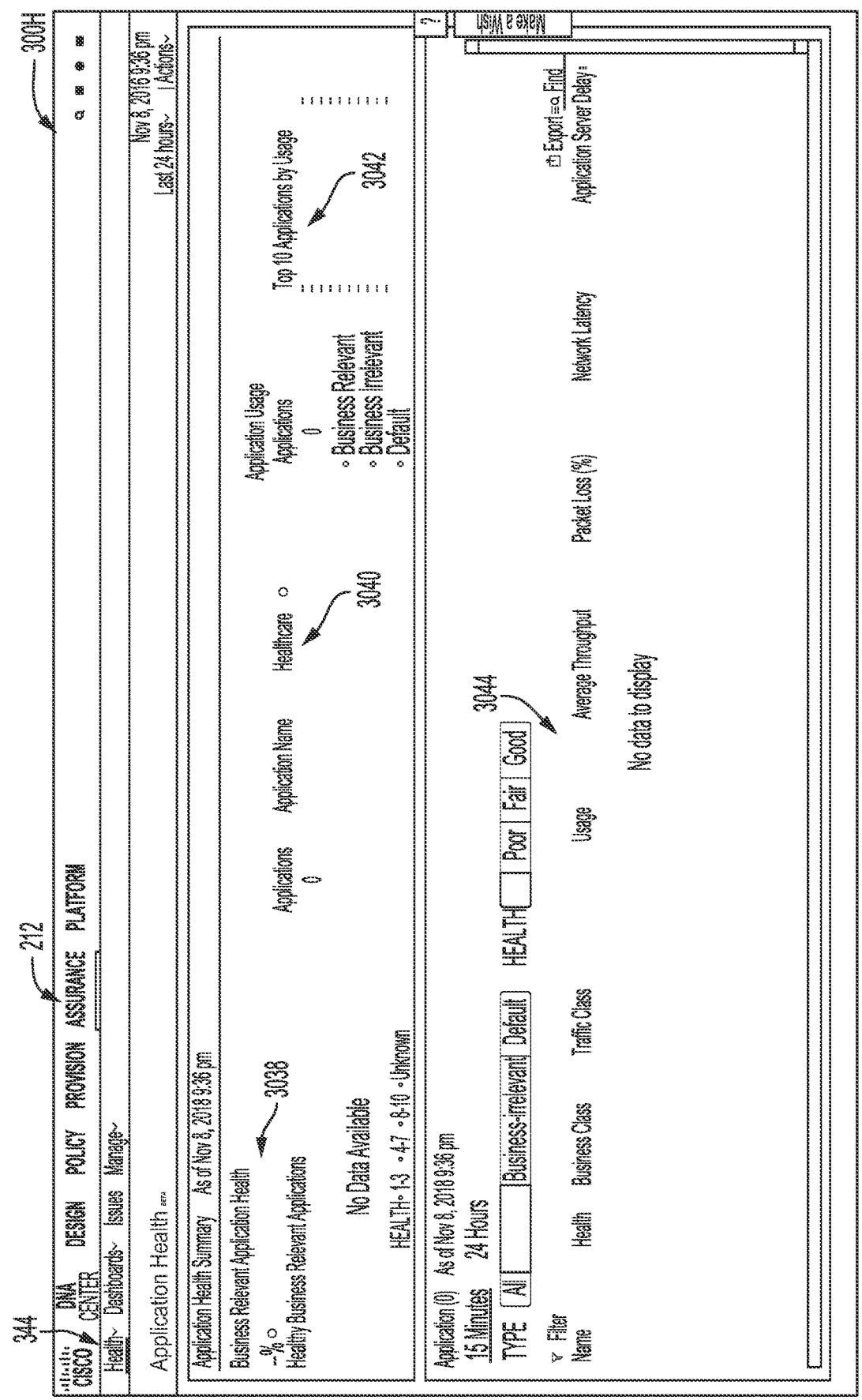
Figure 31:
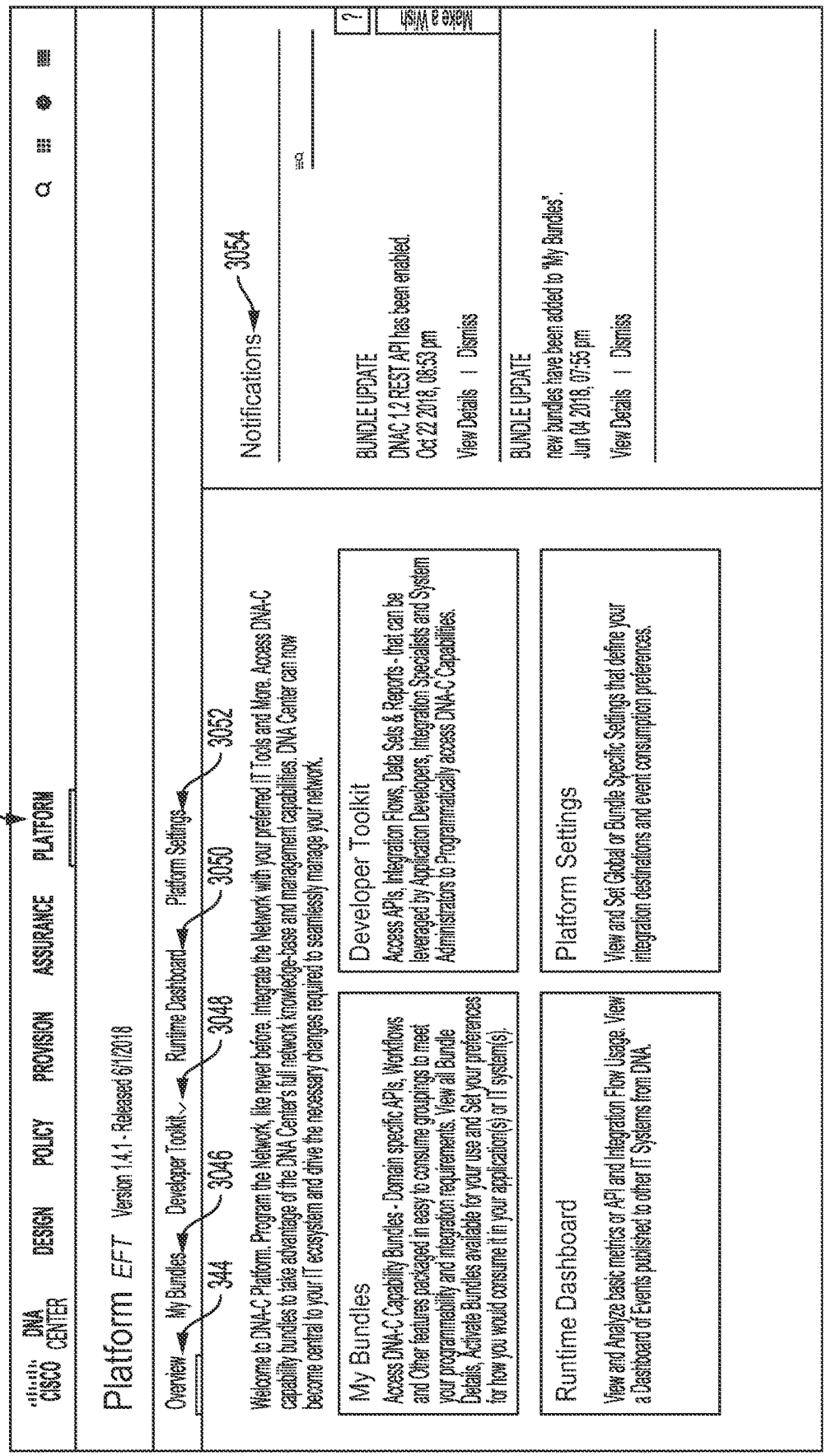

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

FIG. 3I illustrates an example of a graphical user interface 3001, an example of a landing screen for the platform functions 210. The graphical user interface 300C can include various tools and workflows for integrating with other technology systems. In this example, the platform integration tools and workflows include:

A bundles tool 3046 for managing packages of domain-specific APIs, workflows, and other features for network programming and platform integration;

A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;

A runtime dashboard 3050 for viewing and analyzing basic metrics or API and integration flow usage;

A platform settings tool 3052 to view and set global or bundle-specific settings that define integration destinations and event consumption preferences; and A notifications user interface element 3054 for presenting notifications regarding the availability of software updates, security threats, and so forth.

Returning to FIG. 2, the controller layer 220 can include subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 208 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routs and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can include network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
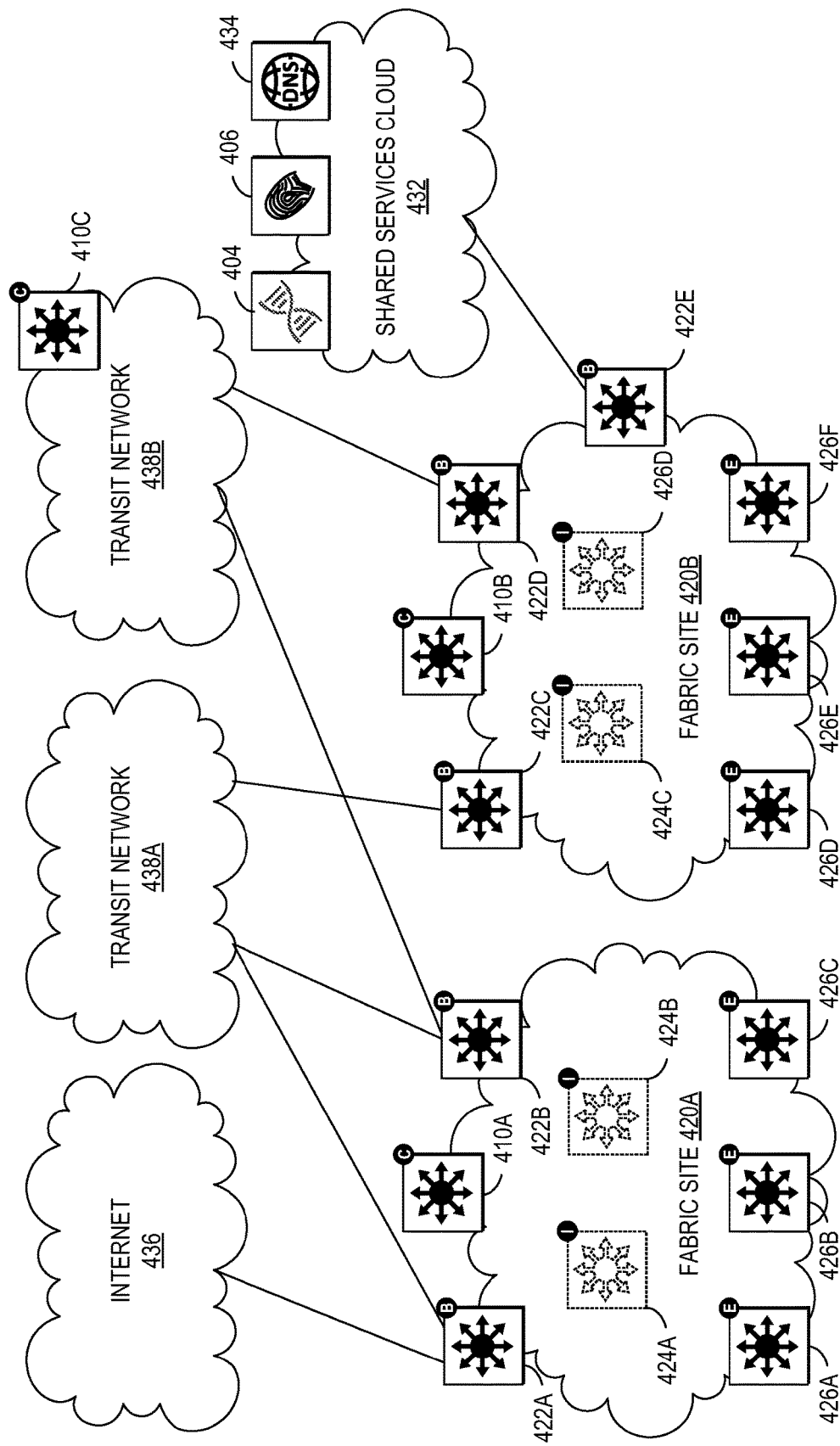
FIG. 4 illustrates an example of a physical topology for a multi-site enterprise network in accordance with some examples.

FIG. 4 illustrates an example of a physical topology for a multi-site enterprise network 400. In this example, the network fabric includes fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410b, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be capable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can include one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5A:
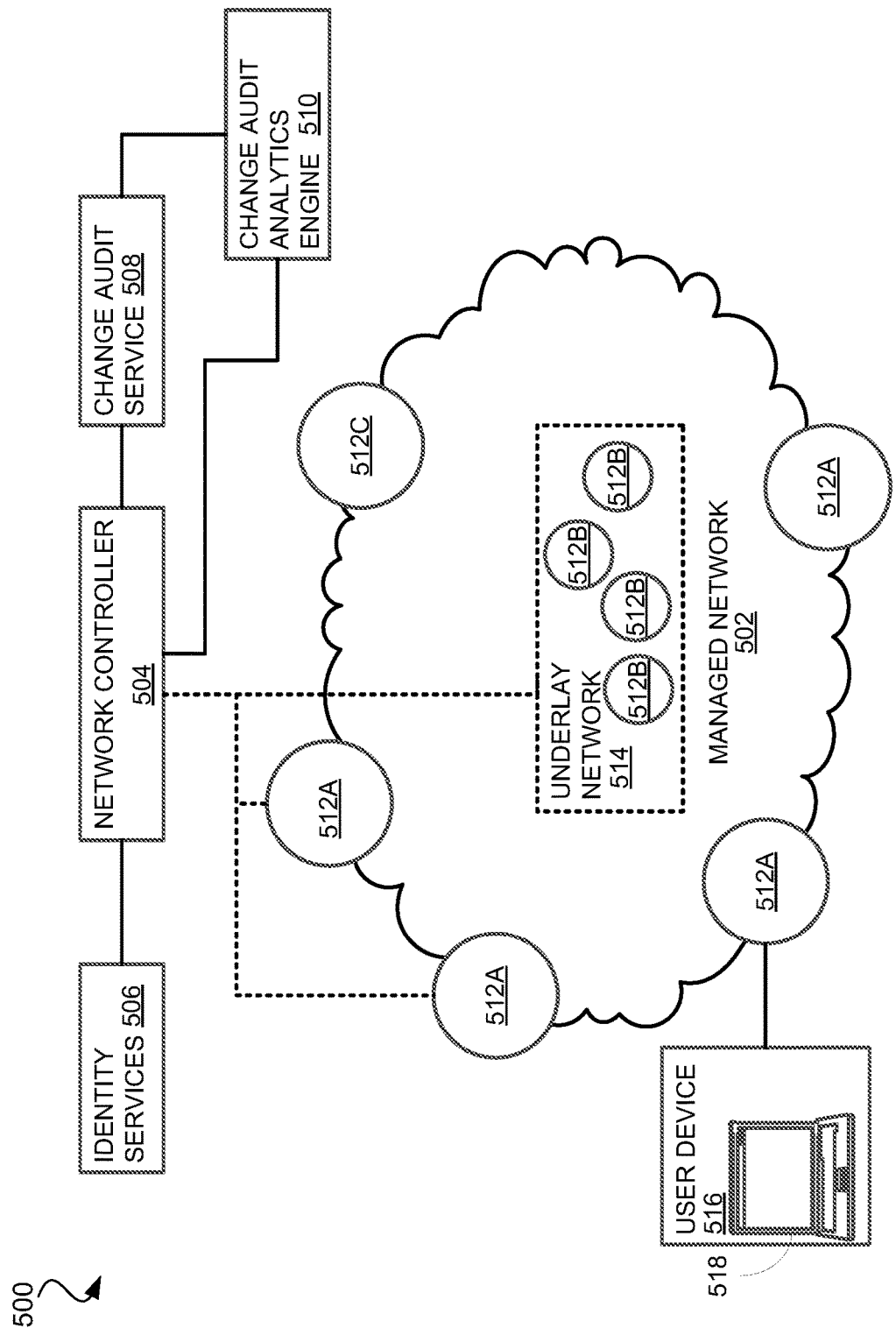
FIG. 5A illustrates an example of an operating environment for a change audit analytics engine in accordance with some examples.

FIG. 5A depicts an operating environment 500 in which the methods and systems of this disclosure may be deployed. In particular, operating environment 500 includes a managed network 502 which is couple to a network controller 504. Network controller 504 may execute commands and/or perform automated processes on managed network 502 across a data plane, control plane, or combination.

In some examples, a user device 516 may access managed network 502 as either or both a network user or a network administrator. Here, user device 516 is a laptop 518, though it is understood that various other computing devices may connect to, and communicate over, managed network 502 according to the architecture, configuration, and design of managed network 502. Network controller 504 may additionally include or communicate with an identity services platform 506 for authenticating user (e.g., user device 516) access to managed network 502. Further, network controller 504 may include or communicate with a change audit service 508, which may provide monitoring and/or alerts of configuration changes pushed to managed network 504 (e.g., via network controller 504 and over a respective data plane or control plane). For example, where a software update is applied to a switch of managed network 502, change audit service 508 may detect the software update, make a record of it, and/or alert other services of it. In another example, where a network administrator makes a configuration change to the switch (e.g., user 516 may add a new access control list (ACL) to the switch), change audit service 508 may likewise detect the configuration change, make a record of it, and/or alert other services, such as a change audit analytics engine (CAAE) 510.

CAAE 510 receives notifications of configuration, software, and other changes to managed network 502. CAAE 510 may interface with change audit service 508 and network controller 504. For example, change audit service 508 may alert CAAE 510 of configuration changes made to components (e.g., switches, routers, networked storage, etc.) managed network 502 and, in response, CAAE 510 may transmit commands (e.g., service requests, health queries, etc.) to network controller 504 to perform a health impact analysis and/or prediction of the configuration changes on managed network 502 and constituent components of managed network 502.

Managed network 502 includes fabric edge nodes 512A, intermediate nodes 512B, and control plane nodes 512C. In general, fabric edges nodes 512A may receive external network traffic from, for example, user device 516 as the network traffic traverses managed network 502. Fabric edge nodes 512A can include access points, terminals, and the like.

Network traffic transmits across intermediate nodes 512B, which together form an underlay network 514. For example, intermediates nodes 512B can include switches, routers, and the like. Control plane nodes 512C provide control plane access and updates for managed network 502, including fabric edge nodes 512A and intermediate nodes 512B. For example, control plane nodes 512C can include a broadcast gateway protocol (BGP) node for updating routing information of switches, routers, and other intermediate nodes 512B.

Figure 5B:
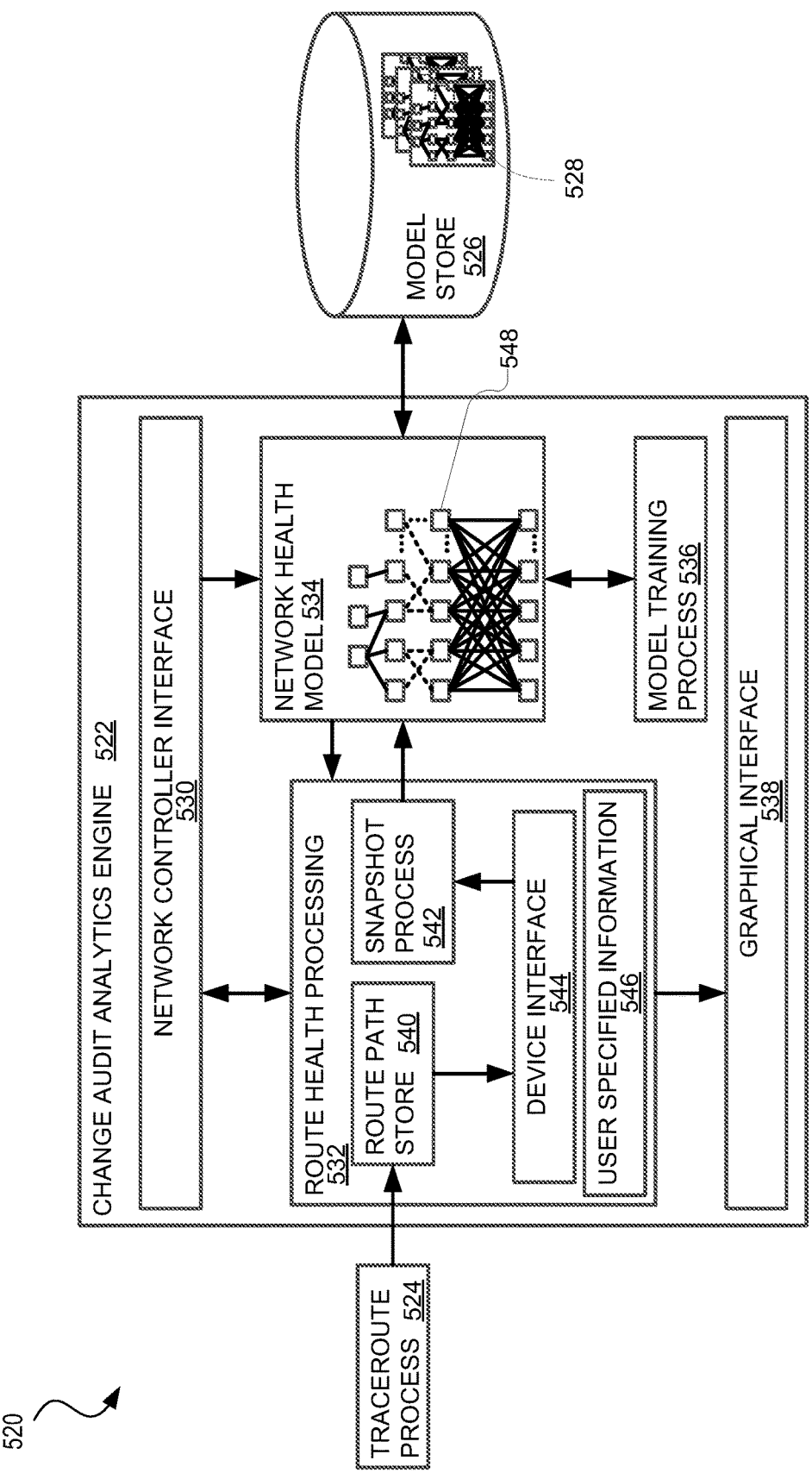
FIG. 5B illustrates an example of a change audit analytics engine system in accordance with some examples.

FIG. 5B depicts a change audit analytics environment 520, which may be part of, for example, operating environment 500. Change audit analytics environment 520 includes a change audit analytics engine (CAAE) 522 for performing network health analytics and predictions in response to changes to a managed network (e.g., to configuration, component, software, etc.). CAAE 522 may be substantially similar to CAAE 510 discussed above.

CAAE 522 interfaces with a traceroute process 524 and a model store 526. In some examples, traceroute process 524 may be a third-party service or provided via, for example and without imputing limitation, network controller 504 discussed above. In general, traceroute process 524 may determine a transmission path through managed network 502 which includes a component which has undergone a configuration change. For example, where a switch has undergone an ACL modification, traceroute process 524 may determine one or more communication paths which include the switch. The determined transmission path may then be provided to CAAE 522 to perform further diagnostics and analysis on managed network 502.

Model store 526 may be a database, cloud storage solution, remote server, local store, or the like. In particular, model store 526 stores trained machine learning models for retrieval and use by CAAE 522. Each machine learning model may be associated with a particular managed network (e.g., for respective clients, etc.), or a grouping of managed network by topology features, etc.

In particular, CAAE 522 includes a route health processing service 532, which receives the transmission path from traceroute process 524, and a network health model 534, which may be used by CAAE 522 to predict an overall network impact of a configuration change. Route health processing service 532 and network health model 534 communicate with a network controller interface 530 which provides a communication channel with a network controller, such as network controller 504 discussed above. Using route health processing service 532 and network health model 534, CAAE 522 is able to generate a holistic view and prediction of a managed network in response to a configuration, topology, or other change to the managed network.

Route health processing service 532 includes a route path store 540, which route health processing service 532 may use to step through the transmission path by interfacing with each network component along the transmission path in sequence and retrieving various health information, such as KPIs and the like. Route health processing service 532 interfaces with each network component through a device interface 544, which can convert protocols, translate requests, supplement queries, etc. according to specific characteristics of each respective network component.

Device interface 544 further communicates with a snapshot process 542. Snapshot process 542 may retrieve and appropriately store network component health information (e.g., KPIs, etc.) and/or facilitate a network health snapshot by performing associating and aggregating component health information across the network to provide a holistic or aggregated accounting of health information of the managed network. In some examples, route health processing service 532 includes user specified information 546, which may include, for example, alert information such as alert thresholds (e.g., a minimum aggregated health score at which to alert network administrators), alert contact information (e.g., network administrator email, phone, message application identifier, etc.), or the like.

Network health model 534 can receive health information from a network controller, through network controller interface 530, as well as snapshot information from snapshot process 542. Network health model 534 includes a neural network 548 retrieved from model store 526 based on the particular managed network and/or network topology for which a health analysis is being performed. In some examples, neural network 548 may be a long short term memory (LSTM) recurrent neural network (RNN) and so includes a memory component and considers an earlier state of the network in making predictions based on a current state of the network. Network health model 534 may undergo training by a model training process 536 using snapshot information from snapshot process 542 over a course of time such as, for example and without imputing limitation, by updating model predictions based multiple snapshots provided by snapshot process 542.

Network health model 534, once trained, may generate a network health prediction based multiple snapshots provided by snapshot process 542. Each snapshot may be retrieved over a period of time following a detected change in the network. For example, network health model 534 may perform a continuous monitoring of the network, via route health processing service 532, over a course of 12 hours. Network health model 534 provides network health predictions to route health processing service 534, and where network health information falls below a certain threshold (e.g., included in user specified information 546) or a sudden change in network health information is observed, alerts may be generated by route health processing service 532.

In some examples, route health processing service 532 may provide predictions and/or other route health information to a graphical interface 538 for reviewing by a network administrator. In some examples, a network administrator may access network health model 534 through graphical interface 538 in order to execute hypothetical scenarios to explore respective impacts of various changes to a managed network.

Figure 5C:
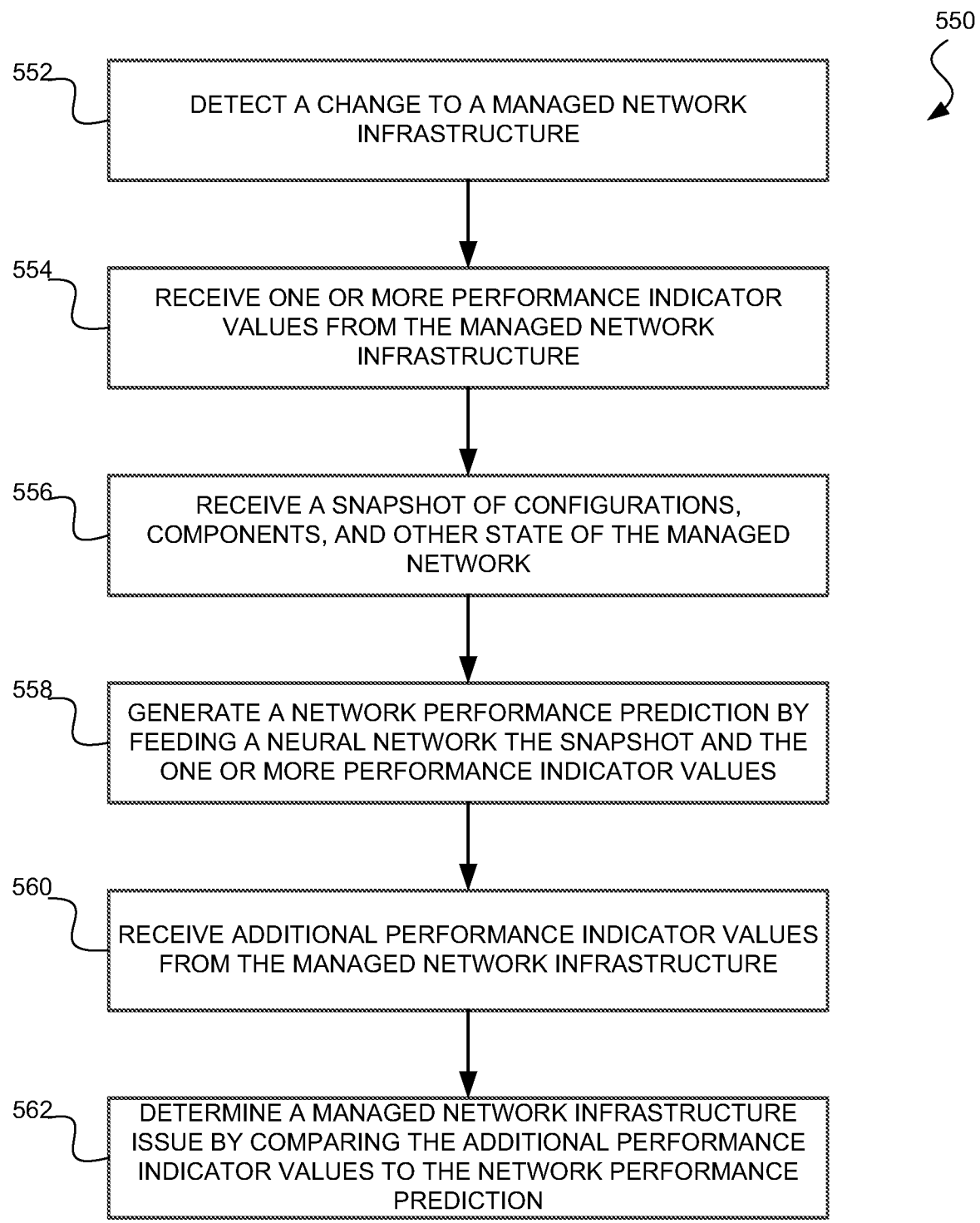
FIG. 5C illustrates an example of a method for determining network issues following a change to the network in accordance with some examples.

FIG. 5C depicts a method 550 for determining whether a managed network will experience and/or is experiencing issues as a result of changes to the managed network configurations, topology, software, etc. Method 55 may be perform by, for example, CAAE 522 or CAAE 510 discussed above. At step 552, a change to a managed network infrastructure is first detected. For example, an external change audit or alerting system may notify a CAAE of a network change or update.

At step 554, one or more performance indicator values are received from the managed network infrastructure. The one or more performance indicator values may be retrieved from various network components along a route through the managed network infrastructure which includes a particular network component which underwent a configuration change (e.g., the detected change of step 552).

At step 556, a snapshot of configurations, components, and other state of the managed network is received. In some examples, a single snapshot includes all the received state of the managed network. In some examples, multiple partial snapshots of the state of the managed network may be received and aggregated to generate a comprehensive snapshot of the managed network.

At step 558, a network performance prediction is generated by feeding the received snapshot and the one or more performance indicator values to a neural network. In particular, the neural network may be a LSTM RNN and may receive multiple sequential snapshots and performance indicator values retrieved sequentially over a course of time (e.g., 12 hours, etc.) following a detected change. As a result, the neural network may include earlier predictions and/or state of the managed network and/or the neural network (e.g., feature values, hidden layer values, etc.) in making an impact prediction.

At step 560, additional performance indicator values are received from the managed network infrastructure. For example, the CAAE may continue to receive updated performance indicator values from the managed network infrastructure and provide a first portion (e.g., before a cut-off time, etc.) to the neural network for predictions, while the remaining portion of values are received for comparison purposes or the like.

At step 562, the CAAE determines there is an issue with the managed network infrastructure by comparison the additional performance indicator values to the network performance prediction generated by the neural network. As a result, a network administrator may be alerted, an interface alert may be generated, or the like.

Figure 5D:
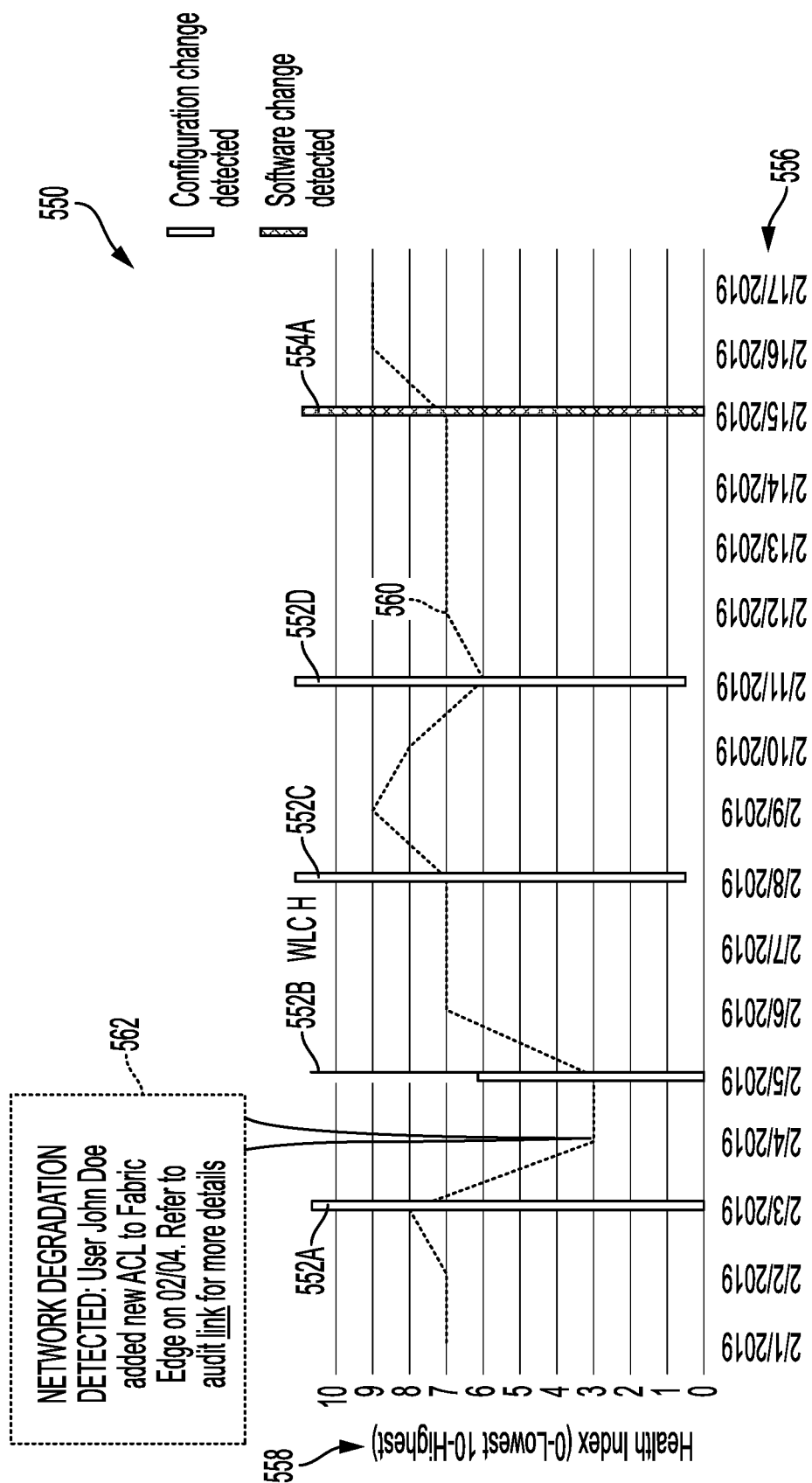
FIG. 5D illustrates an example of an interface displaying change based network health audit information in accordance with some examples.

FIG. 5D illustrates a graphical user interface (GUI) 550 which a network administrator may use to review performance impacts following a change to a managed network. In some examples, GUI 550 may be generated as a result of method 500 following a performance analysis by a CAAE (e.g., CAAE 510, 522, etc.).

GUI 550 includes a line graph made of a health index axis 558 and a time axis 556. Health index axis 558 may provide a simple scale of holistic health values (e.g., 1-10) for providing a network administrator an intuitive view of a respective managed network's aggregated and/or holistic health. Time axis 556 can include various dates associated with detected changes in the managed network which caused a respective health and/or performance impact analysis.

A health index trend line 560 provides tracking of network health over a time series defined by time axis 556. Along health index trend line 560, change detection event bars 552-554 indicate when a change in configurations or software was detected. In some examples, change detection event bars 552-554 may be color coded. For example, change detection event bars 552A-552D may be yellow and be associated with configuration (e.g., ACL, routing rules, firewall adjustments, etc.) changes to a network device. Likewise, change detection event bar 554A may be green and be associated with a software change such as a routing software patch or the like. Additionally, various points along health index trend line 560 may be interactable to bring up an information modal (e.g., a "pop-up", "tooltip", etc.) 562 which includes information related to a respective health index score, event change, or both. Here, for example, information modal 562 includes a detail that a network degradation has been detected and is associated with a new ACL added by a user (John Doe) to a fabric edge node. Further, a link to a more detailed event audit may be included in information modal 562.

Figure 6A:
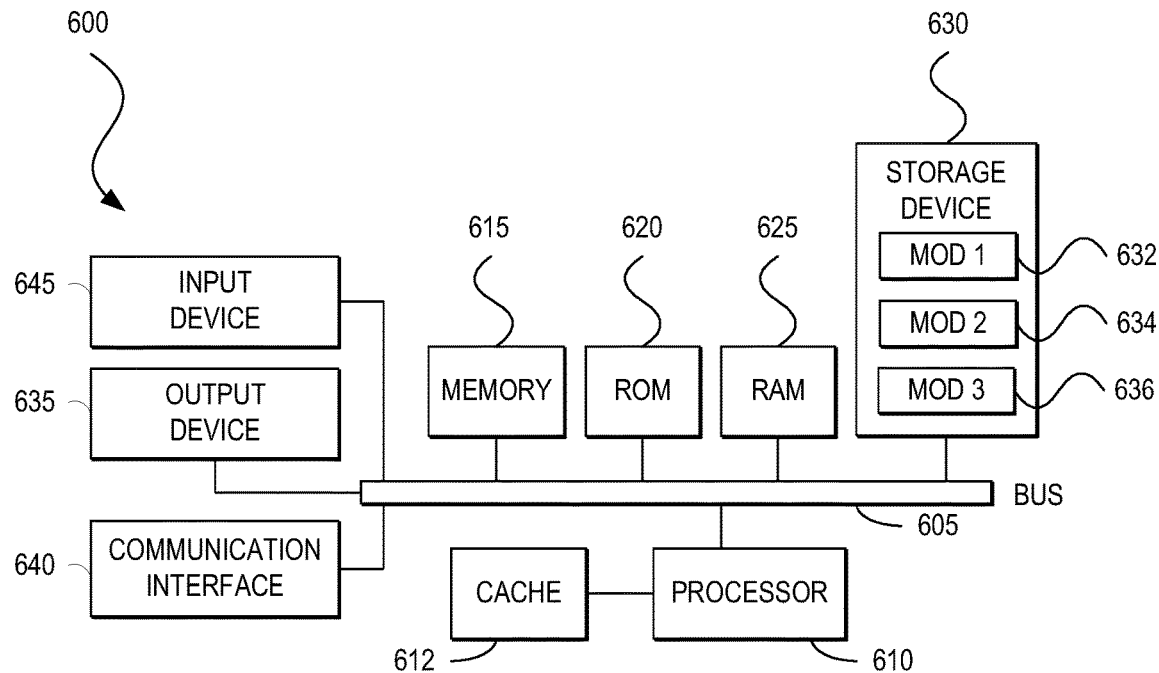
FIGS. 6A and 6B illustrate examples of systems in accordance with some examples.
Figure 6B:
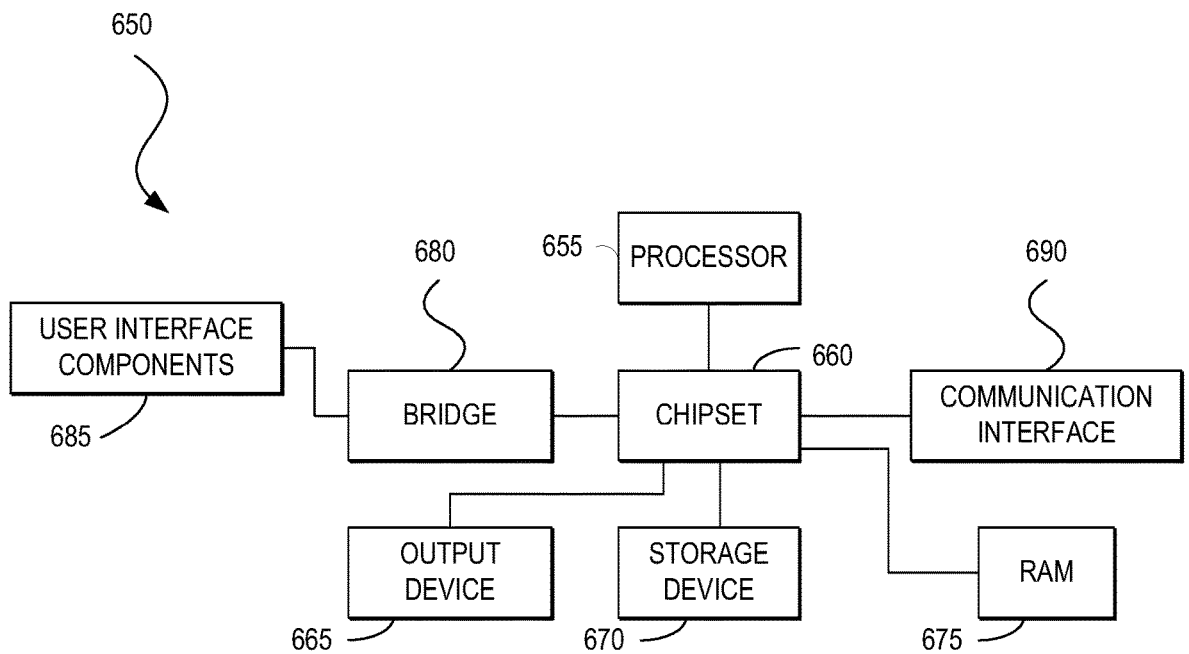

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

A series of statements describing some examples is included below to provide clarity and understanding of the technology disclosed herein:

Statement 1: In one example, a method for identifying network infrastructure issues includes detecting a change to a network infrastructure, the change including one or more of a software modification or a configuration modification, receiving one or more performance indicator values from the network infrastructure, generating a predicted network performance based on the received one or more performance indicator values and a network snapshot including one or more preceding performance indicator values of the network infrastructure preceding the detected change, the predicted network performance generated by a neural network, the predicted network performance including one or more predicted performance indicator values, receiving one or more later performance indicator values from the network infrastructure, and determining a network infrastructure issue by comparing the predicted network performance with the received one or more later performance indicator values, wherein determining the network infrastructure issue includes identifying a degree of deviation between the predicted network performance and the received one or more later performance indicator values, the identified degree of deviation exceeding a predetermined threshold.

Statement 2: The method of Statement 1 may include the neural network being a recurrent neural network (RNN).

Statement 3: The method of preceding Statement 2 may include the RNN including a memory component.

Statement 4: The method of preceding Statement 3 may include the memory component being a long short-term memory (LSTM).

Statement 5: The method of any of the preceding Statements may further include generating an alert indicating the determined network infrastructure issue, the alert including one or more of an interface alert, a text message, or an email.

Statement 6: The method of any of the preceding Statements may further include generating a graphical user interface (GUI) including a network health trend line and one or more detected event bars, at least one of the one or more detected event bars corresponding to the detected change to the network infrastructure.

Statement 7: The method of preceding Statement 6 may include the detected event bars being interactable and interacting with one of the detected event bars generates an information modal comprising summary information of the corresponding detected change and a respective impact on network performance.

Statement 8: In one example, a system for identifying network infrastructure issues includes one or more processors, and a memory including instructions for the one or more processors to detect a change to a network infrastructure, the change including one or more of a software modification or a configuration modification, receive one or more performance indicator values from the network infrastructure, generate a predicted network performance based on the received one or more performance indicator values and a network snapshot including one or more preceding performance indicator values of the network infrastructure preceding the detected change, the predicted network performance generated by a neural network, the predicted network performance including one or more predicted performance indicator values, receive one or more later performance indicator values from the network infrastructure, and determine a network infrastructure issue by comparing the predicted network performance with the received one or more later performance indicator values, wherein determining the network infrastructure issue includes identifying a degree of deviation between the predicted network performance and the received one or more later performance indicator values, the identified degree of deviation exceeding a predetermined threshold.

Statement 9: The system of preceding Statement 8 may include the neural network being a recurrent neural network (RNN).

Statement 10: The system of preceding Statement 9 may include the RNN including a memory component.

Statement 11: The system of preceding Statement 10 may include the memory component being a long short-term memory (LSTM).

Statement 12: The system of any of preceding Statements 8-11 may include the memory further including instructions to generate an alert indicating the determined network infrastructure issue, the alert including one or more of an interface alert, a text message, or an email.

Statement 13: The system of any of preceding Statements 8-12 may include the memory further including instructions to generate a graphical user interface (GUI) including a network health trend line and one or more detected event bars, at least one of the one or more detected event bars corresponding to the detected change to the network infrastructure.

Statement 14: The system of preceding Statement 13 may include the detected event bars being interactable and interacting with one of the detected event bars generates an information modal including summary information of the corresponding detected change and a respective impact on network performance.

Statement 15: In one example, a non-transitory computer readable medium includes instructions that, when executed by one or more processors, cause the one or more processors to detect a change to a network infrastructure, the change including one or more of a software modification or a configuration modification, receive one or more performance indicator values from the network infrastructure, generate a predicted network performance based on the received one or more performance indicator values and a network snapshot including one or more preceding performance indicator values of the network infrastructure preceding the detected change, the predicted network performance generated by a neural network, the predicted network performance including one or more predicted performance indicator values, receive one or more later performance indicator values from the network infrastructure, and determine a network infrastructure issue by comparing the predicted network performance with the received one or more later performance indicator values, wherein determining the network infrastructure issue includes identifying a degree of deviation between the predicted network performance and the received one or more later performance indicator values, the identified degree of deviation exceeding a predetermined threshold.

Statement 16: The non-transitory computer readable medium of preceding Statement 15 may include the neural network being a recurrent neural network (RNN).

Statement 17: The non-transitory computer readable medium of preceding Statement 16 may include the RNN including a memory component.

Statement 18: The non-transitory computer readable medium of preceding Statement 17 may include the memory component being a long short-term memory (LSTM).

Statement 19: The non-transitory computer readable medium of any of preceding Statements 15-18 may further include instructions that cause the one or more processors to generate an alert indicating the determined network infrastructure issue, the alert including one or more of an interface alert, a text message, or an email.

Statement 20: The non-transitory computer readable medium of any of preceding Statements 15-19 may further include instructions that cause the one or more processors to generate a graphical user interface (GUI) including a network health trend line and one or more detected event bars, at least one of the one or more detected event bars corresponding to the detected change to the network infrastructure, wherein the detected event bars are interactable and interacting with one of the detected event bars generates an information modal including summary information of the corresponding detected change and a respective impact on network performance.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for identifying network infrastructure issues, the method comprising:
   detecting a change to a network infrastructure, the change comprising one or more of a software modification or a configuration modification;
   in response to the detected change, receiving one or more performance indicator values from network components along a route through the network infrastructure including a network component where the change occurred;
   receiving a network snapshot comprising one or more preceding performance indicator values of the network infrastructure preceding the detected change;
   generating, by a neural network, a predicted network performance comprising one or more predicted performance indicator values based on inputs to the neural network including at least the received one or more performance indicator values and the network snapshot;
   receiving one or more later performance indicator values from the network infrastructure;
   identifying a degree of deviation between the one or more predicted performance indicator values and the received one or more later performance indicator values at least by comparing the one or more predicted performance indicator values and the received one or more later performance indicator values; and
   in response to the identified degree of deviation exceeding a predetermined threshold, determining a network infrastructure issue.

2. The method of claim 1, wherein the neural network is a recurrent neural network (RNN).

3. The method of claim 2, wherein the RNN includes a memory component.

4. The method of claim 3, wherein the memory component is a long short-term memory (LSTM).

5. The method of claim 1, further comprising generating a graphical user interface (GUI) comprising a network health trend line and one or more detected event bars, at least one of the one or more detected event bars corresponding to the detected change to the network infrastructure.

6. The method of claim 5, wherein the detected event bars are interactable and interacting with one of the detected event bars generates an information modal comprising summary information of the corresponding detected change and a respective impact on network performance.

7. The method of claim 1, further comprising generating an alert indicating the determined network infrastructure issue, the alert comprising one or more of an interface alert, a text message, or an email.

8. A system for identifying network infrastructure issues, the system comprising:
   one or more processors; and
   a memory comprising instructions for the one or more processors to:
      detect a change to a network infrastructure, the change comprising one or more of a software modification or a configuration modification;
      in response to the detected change, receive one or more performance indicator values from network components along a route through the network infrastructure including a network component where the change occurred;
      receiving a network snapshot comprising one or more preceding performance indicator values of the network infrastructure preceding the detected change;
      generate, by a neural network, a predicted network performance comprising one or more predicted performance indicator values based on inputs to the neural network including at least the received one or more performance indicator values and the network snapshot;
      receive one or more later performance indicator values from the network infrastructure;
      identifying a degree of deviation between the one or more predicted performance indicator values and the received one or more later performance indicator values at least by comparing the one or more predicted performance indicator values and the received one or more later performance indicator values; and in response to the identified degree of deviation exceeding a predetermined threshold, determining a network infrastructure.

9. The system of claim 8, wherein the neural network is a recurrent neural network (RNN).

10. The system of claim 9, wherein the RNN includes a memory component.

11. The system of claim 10, wherein the memory component is a long short-term memory (LSTM).

12. The system of claim 8, wherein the memory further comprises instructions to generate a graphical user interface (GUI) comprising a network health trend line and one or more detected event bars, at least one of the one or more detected event bars corresponding to the detected change to the network infrastructure.

13. The system of claim 12, wherein the detected event bars are interactable and interacting with one of the detected event bars generates an information modal comprising summary information of the corresponding detected change and a respective impact on network performance.

14. The system of claim 8, wherein the memory further comprises instructions to generate an alert indicating the determined network infrastructure issue, the alert comprising one or more of an interface alert, a text message, or an email.

15. A non-transitory computer readable medium comprising instructions that, when executed by one or more processors, cause the one or more processors to:
detect a change to a network infrastructure, the change comprising one or more of a software modification or a configuration modification;
in response to the detected change, receive one or more performance indicator values from network components along a route through the network infrastructure including a network component where the change occurred;
receiving a network snapshot comprising one or more preceding performance indicator values of the network infrastructure preceding the detected change;
generate, by a neural network, a predicted network performance comprising one or more predicted performance indicator values based on inputs to the neural network including at least the received one or more performance indicator values and the network snapshot;
receive one or more later performance indicator values from the network infrastructure;
identifying a degree of deviation between the one or more predicted performance indicator values and the received one or more later performance indicator values at least by comparing the one or more predicted performance indicator values and the received one or more later performance indicator values; and
in response to the identified degree of deviation exceeding a predetermined threshold, determining a network infrastructure.

16. The non-transitory computer readable medium of claim 15, wherein the neural network is a recurrent neural network (RNN).

17. The non-transitory computer readable medium of claim 16, wherein the RNN includes a memory component.

18. The non-transitory computer readable medium of claim 17, wherein the memory component is a long short-term memory (LSTM).

19. The non-transitory computer readable medium of claim 15, further comprising instructions that cause the one or more processors to generate an alert indicating the determined network infrastructure issue, the alert comprising one or more of an interface alert, a text message, or an email.

20. The non-transitory computer readable medium of claim 15, further comprising instructions that cause the one or more processors to generate a graphical user interface (GUI) comprising a network health trend line and one or more detected event bars, at least one of the one or more detected event bars corresponding to the detected change to the network infrastructure, wherein the detected event bars are interactable and interacting with one of the detected event bars generates an information modal comprising summary information of the corresponding detected change and a respective impact on network performance.

* * * * *